No. 639,464. Patented Dec. 19, 1899.
R. THOMPSON.
COUPLING FOR ELECTRIC OR OTHER WIRES.
(Application filed Oct. 11, 1899.)
(No Model.)
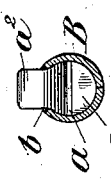
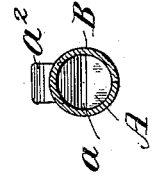
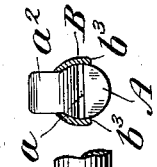
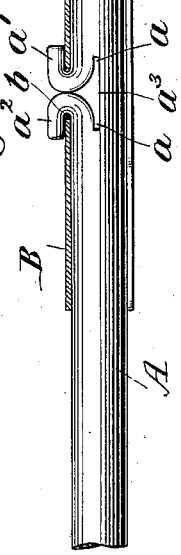
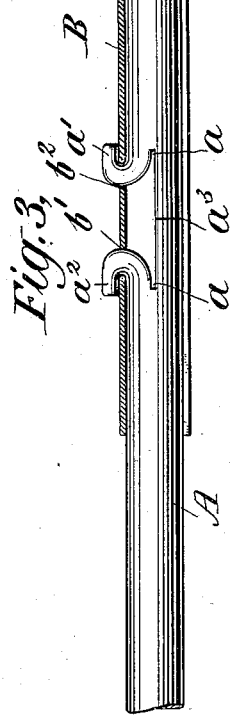
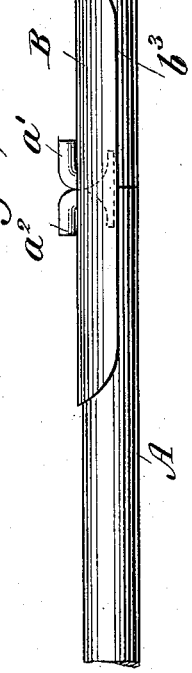
WITNESSES:
INVENTOR
Rolland Thompson
BY
ATTORNEY

UNITED STATES PATENT OFFICE.

ROLLAND THOMPSON, OF NEWARK, NEW JERSEY, ASSIGNOR OF ONE-HALF TO JOHN DUNPHY, OF NEW YORK, N. Y.

COUPLING FOR ELECTRIC OR OTHER WIRES.

SPECIFICATION forming part of Letters Patent No. 639,464, dated December 19, 1899.

Application filed October 11, 1899. Serial No. 733,306. (No model.)

*To all whom it may concern:*

Be it known that I, ROLLAND THOMPSON, a citizen of the United States, and a resident of Newark, in the county of Essex and State of New Jersey, have invented certain new and useful Improvements in Couplings for Electric or other Wires, of which the following is a specification.

The object of my present invention is to provide a new and improved coupling for joining the ends of trolley and other forms of electric wires which will obviate the use of solder or similar material to form the joint; and it consists of a split sleeve or shield with either one or two slots, as may be preferred, formed in the upper side thereof, through which pass hooks on the ends of the wires to be joined, as will now be set forth in detail.

Figure 1 is a central longitudinal view, partly in section, of one form of my improved coupling. Fig. 2 is a cross-section through middle of same. Fig. 3 is a central longitudinal view, partly in section, of a coupler having two slots in its upper side; Fig. 4, a cross-section through middle of same; Fig. 5, a side elevation of coupler, showing same with shortened sides; Fig. 6, a cross-section through middle of same.

In constructing my invention I prepare an open sleeve or shield B, Fig. 1, of suitable length, the inner diameter of same being of approximately the same size as the diameter of the wires to be joined, and in the upper side of this sleeve are formed either one or two slots, as shown in Figs. 1 and 3, respectively. In preparing the wires A A' the ends are first split horizontally for a distance of about three-fourths of an inch, as at $a\,a$, and the upper portions formed into the hooks $a'$ $a^2$, the lower horizontal portions thereof being designed to abut, as shown at $a^3$, when the wires are in position.

In Fig. 1 I show a coupling having but one slot, through which are passed the hooks formed by upturning the upper portions of the split ends of the wires to be joined, the lower sections of the ends having first been cut off sufficiently to permit of their abutting, as at $a^3$, when the hooks $a'$ $a^2$ are passed through the slot B in the upper side of the shield. The sides of the coupling are then bent by a suitable tool, so as to firmly embrace or clamp the ends of the wires A A' together, as shown in Fig. 1.

In Fig. 3 are shown wires A A', with their ends horizontally split at $a\,a$, and hooks $a'\,a^2$, formed by upturning the upper sections of the split ends. The lower sections of the wires abut at $a^3$, and since they have not been shortened, as in Fig. 1, the coupling is provided with two slots, with which the hooks engage. This form is preferred where it is not convenient or desirable to saw off the lower abutting portions so as to enable the hooks to be in contact with each other, as is necessary when using the form of coupling shown in Fig. 1.

For use in joining trolley-wires since it is always preferable to form an even lower surface for the passage of the trolley-wheel over the joined ends I have provided the form shown in Fig. 5, wherein it will be observed that the sides of the coupler are shortened, so that when it is clamped around the wires it passes but slightly over half-way around them, the lower edges terminating at $b^3$. By this means the trolley-wheel in passing over the united ends is always in direct contact with the main wire.

In my previous patent, No. 631,864, I provided a flush lower surface on the under side of the wire, but accomplish this by cutting away the ends of the wires to be joined, so that the lower side portions of the coupling came between them, and thus presented an even surface; but in the present improvement I obviate this cutting away of the under surface of the wires and am able to provide a continuous and uninterrupted contact of the trolley-wheel with the wire and at the same time furnish a much stronger means of joining the ends together.

What I claim as new is—

1. A coupling for wires composed of a tubular shield open along one side and having a slot on the opposite side thereof, in combination with wires, having their ends horizontally split and the upper portions of said ends formed into hooks which engage with said slot, and the lower portions abutting so as to form a flush surface on the under side of said wires, substantially as set forth.

2. A coupling for wires composed of a tubular shield open along one side and having a slot on the opposite side thereof, in combination with wires, having their ends horizontally split and the upper portions of said ends formed into hooks which engage said slot, the lower portions abutting and forming a flush surface on the under side of said wires between the divergent ends of said shield, substantially as set forth.

3. A coupling for trolley-wires, comprising wires, with ends horizontally split, and the upper portions of said ends formed into hooks and their lower portions abutting and forming a continuous surface on the under side of said wires, and a tubular shield containing slots on one side thereof to engage the said hooks, the sides thereof passing around the ends of the wires so as to meet on the opposite side, substantially as set forth.

Signed at New York, in the county of New York and State of New York, this 2d day of October, A. D. 1899.

ROLLAND THOMPSON.

Witnesses:
C. F. DELANY,
A. J. ZERBE.